J. MICHEL.
ANTISKID DEVICE.
APPLICATION FILED AUG. 23, 1918.
1,320,886.
Patented Nov. 4, 1919.
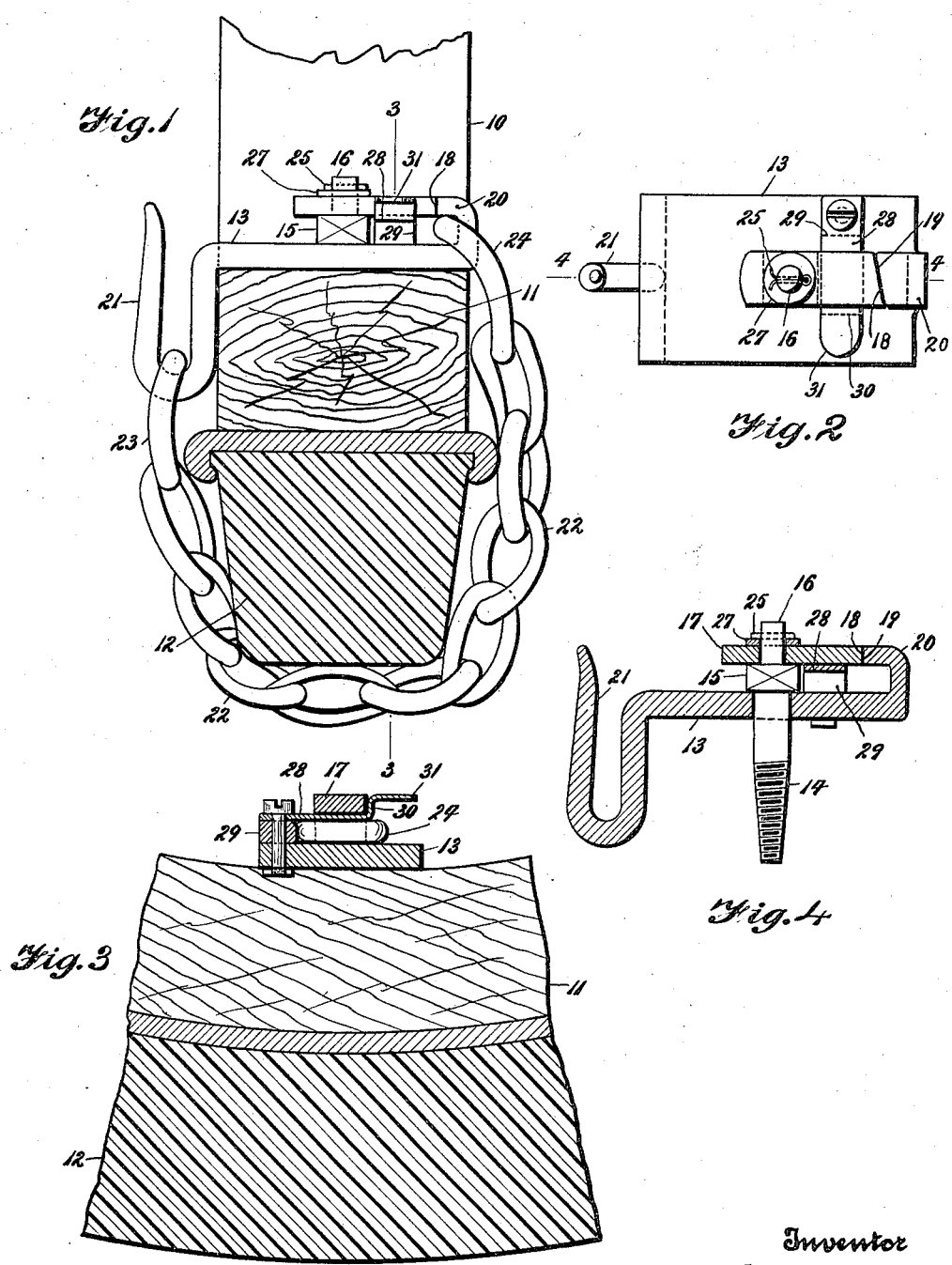
Inventor
John Michel
By Victor J. Evans
Attorney
Witness
Alfred F. Bratley

UNITED STATES PATENT OFFICE.

JOHN MICHEL, OF PHILADELPHIA, PENNSYLVANIA.

ANTISKID DEVICE.

1,320,886.  Specification of Letters Patent.  Patented Nov. 4, 1919.

Application filed August 23, 1918. Serial No. 251,158.

*To all whom it may concern:*

Be it known that I, JOHN MICHEL, a citizen of the United States, residing at #3013 North Taney St., Philadelphia, in the county of Philadelphia and State of Pennsylvania, have invented new and useful Improvements in Antiskid Devices, of which the following is a specification.

An object of the invention is to provide an anti-skid device for use on vehicles to prevent the latter from skidding on wet and slippery pavements.

The invention comprehends among other features, the provision of an anti-skid device that is particularly adapted for use on motor trucks which use solid tires, and to this end the invention comprehends a suitable plate secured to the rim or felly of the wheel, with a chain or other suitable element having its ends connected to the plate and spanning the tire on the wheel, the connection of the chain to the plate being so arranged that the chain can be readily applied and easily removed, and should the chain accidentally break, the pieces will drop off, thus preventing interference of the chain with the brake band of the vehicle.

In the further disclosure of the invention, reference is to be had to the accompanying drawing, constituting a part of this specification, in which similar characters of reference denote corresponding parts in all the views, and in which—

Figure 1 is a vertical sectional view taken through a vehicle wheel showing my device applied thereto.

Fig. 2 is a plan view of the plate.

Fig. 3 is a vertical sectional view taken on the line 3—3 in Fig. 1, and

Fig. 4 is a vertical sectional view taken on the line 4—4 in Fig. 2.

Referring more particularly to the views, the numeral 10 indicates the vehicle wheel and the numeral 11 the felly thereof, a solid tire 12 being mounted upon the felly. A plate 13 is arranged crosswise of the felly on the inner side thereof and preferably between the spokes, and the plate is secured in position by a headed screw 14 passing transversely through the plate and into the felly, said screw on the head 15 thereof having a suitable projecting stud 16, on which is mounted to turn a keeper 17 having a beveled edge 18 which, when the keeper is in closed position abuts against the beveled edge 19 of a lug 20 integral with the plate 13, and projecting over an end thereof. The other end of the plate 13 is formed with a hook 21, and it will be seen that one end of a chain 22 has a link 23 adapted to be hooked over the hook 21, and then pass across the tire 12, with the other end link 24 secured over the hook-like lug 20, after which the keeper 17 is moved into closed position, as shown, it being understood that the keeper is held on the stud 16 by a suitable cotter pin 25, passing through an aperture 26 in the free end of the stud, with a washer 27 interposed between the keeper and the cotter pin.

In order to lock the keeper 17 in place, a locking element 28, in the nature of a flat spring, is secured at one end to a projection 29 on the plate 13, and said spring passes beneath the keeper and has an up-turned portion 30 and an extension forming a handle 31, the up-turned portion 30 bearing against an edge of the keeper to lock the same securely in place.

To remove the chain it is merely necessary to press down on the handle 31 sufficiently to swing the keeper 17 into an open position, and the link 24 can then be unhooked from the hook-like lug 20, and then of course the link 23 can easily be removed from the hook 21.

With this construction it will be very easy to apply the chain 22 to the hook 21 and secure the same beneath the lug 20, and the chain can be very readily removed when it is desired to do so. It will be particularly noted that the end of the plate 13 having the hook 21 thereon, is preferably disposed on the inside of the vehicle wheel adjacent to the usual brake drum (not shown) so that should the chain break, as ofttimes occurs, the rotation of the wheel will cause the link 23 to slip away and out of engagement with the hook 21, enabling the broken chain to drop to the ground, and thereby prevent entangling of the broken chain with the brake drum of the motor vehicle.

The device described is of simple construction; consists of few parts; can be cheaply manufactured, and by reason of its simplicity the anti-skid chains can be applied or removed in a very short space of time.

Having described my invention, I claim:

1. A securing device for use with a body, comprising a plate, a keeper and a pin securing said plate rigidly to the body and simultaneously supporting the keeper for the movement of the latter into or out of locked relation with a portion of said plate.

2. A securing device for use with a body, comprising a plate, a keeper and a pin passing transversely through the plate and into the body to secure the former rigidly to the latter, said pin also movably supporting said keeper for the movement of the latter into or out of locked relation with a portion of said plate.

3. A securing device for use with a body comprising a plate, a lug on the plate, a keeper and a pin for rigidly securing said plate to said body and simultaneously supporting said keeper for the movement of the latter into or out of engagement with said lug.

4. A securing device for use with a body, comprising a plate provided with a hook, a lug on the plate in opposed relation to the hook, a keeper, a threaded pin adapted to pass through the plate and into the body and rigidly secure the plate to the body, said pin also movably supporting the keeper for the engagement of the latter with the said lug and a locking element on the plate and having an off-set portion for engagement with the keeper to lock the latter in engagement with the said lug.

5. A securing device for use with a body, comprising a plate, a keeper, a pin rigidly securing said plate to said body and having a portion thereof forming a support for movably carrying said keeper for the movement of the latter relative to said plate and means for locking said keeper against movement relative to the plate.

6. A securing device for use with a body, comprising a plate, a lug on the plate, a keeper, a pin passing through the plate and into the body to rigidly secure the former to the latter, said pin movably supporting said keeper for the movement of the latter into or out of engagement with said lug and means for locking said keeper relative to said lug.

In testimony whereof I have affixed my signature.

JOHN MICHEL.

Copies of this patent may be obtained for five cents each, by addressing the "Commissioner of Patents, Washington, D. C."